(12) United States Patent
Hedlund et al.

(10) Patent No.: US 9,705,650 B2
(45) Date of Patent: Jul. 11, 2017

(54) METHOD AND NETWORK NODE FOR DETERMINING AN INITIAL CONFIGURATION OF GENERATION OF UPLINK REFERENCE SIGNALS

(71) Applicant: Telefonaktiebolaget L M Ericsson (publ), Stockholm (SE)

(72) Inventors: Leo Hedlund, Älvsjö (SE); Magnus Finne, Sundbyberg (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 0 days.

(21) Appl. No.: 14/431,924

(22) PCT Filed: Sep. 27, 2012

(86) PCT No.: PCT/SE2012/051035
§ 371 (c)(1),
(2) Date: Mar. 27, 2015

(87) PCT Pub. No.: WO2014/051478
PCT Pub. Date: Apr. 3, 2014

(65) Prior Publication Data
US 2015/0288496 A1    Oct. 8, 2015

(51) Int. Cl.
*H04L 5/00* (2006.01)
*H04L 1/00* (2006.01)
(Continued)

(52) U.S. Cl.
CPC .......... *H04L 5/0048* (2013.01); *H04L 1/0022* (2013.01); *H04L 1/0026* (2013.01);
(Continued)

(58) Field of Classification Search
CPC ... H04L 1/0022; H04L 1/0026; H04L 5/0048; H04L 5/0051; H04L 5/0057
(Continued)

(56) References Cited

U.S. PATENT DOCUMENTS

2008/0132166 A1*  6/2008  Park ..................... H04W 52/08
                                                              455/15
2008/0268857 A1* 10/2008  McCoy ................. H04W 24/10
                                                             455/447
(Continued)

FOREIGN PATENT DOCUMENTS

WO    2011068995 A2    6/2011
WO    2011100466 A2    8/2011

OTHER PUBLICATIONS

3GPP, "3rd Generation Partnership Project; Technical Specification Group Radio Access Network; Evolved Universal Terrestrial Radio Access (E-UTRA); LTE physical layer; General description (Release 11)", 3GPP TS 36.201 V11.0.0, Sep. 2012, 1-13.

*Primary Examiner* — Stephen J Clawson
(74) *Attorney, Agent, or Firm* — Patents on Demand P.A.; Brian K. Buchheit; Scott M. Garrett

(57) ABSTRACT

It is presented a method for determining an initial configuration of generation of uplink reference signals for a wireless terminal, the method being performed in a network node. The method comprises: obtaining at least one parameter used in a random access procedure associated with the wireless terminal, wherein each one of the at least one parameter is associated with the wireless terminal; and determining an initial configuration for the wireless terminal for generation of uplink reference signals, based on the at least one parameter. A corresponding network node is also presented.

18 Claims, 2 Drawing Sheets

(51) Int. Cl.
*H04W 72/04* (2009.01)
*H04W 76/02* (2009.01)
H04W 52/36 (2009.01)
H04W 84/04 (2009.01)
H04W 88/02 (2009.01)

(52) U.S. Cl.
CPC .......... *H04L 5/0051* (2013.01); *H04L 5/0057* (2013.01); *H04W 72/0453* (2013.01); *H04W 76/021* (2013.01); *H04W 52/365* (2013.01); *H04W 84/042* (2013.01); *H04W 88/02* (2013.01)

(58) Field of Classification Search
USPC .......................................................... 370/329
See application file for complete search history.

(56) References Cited

U.S. PATENT DOCUMENTS

| | | | |
|---|---|---|---|
| 2011/0199985 A1* | 8/2011 | Cai | H04L 1/0026 370/329 |
| 2011/0294529 A1* | 12/2011 | Luo | H04L 5/0048 455/509 |
| 2012/0063425 A1* | 3/2012 | Wang | H04W 56/0045 370/336 |
| 2012/0106471 A1 | 5/2012 | Behravan et al. | |

\* cited by examiner

METHOD AND NETWORK NODE FOR DETERMINING AN INITIAL CONFIGURATION OF GENERATION OF UPLINK REFERENCE SIGNALS

TECHNICAL FIELD

The invention relates to a method and network node for use in a cellular communication system, and in particular to a method and network node for determining an initial configuration of generation of uplink reference signals.

BACKGROUND

In cellular communication systems, resource allocation to wireless terminals on both downlink (communication from the network to the wireless terminal) and uplink (communication from the wireless terminal to the network) can be performed adaptively using scheduling. This scheduling can take into account instantaneous traffic pattern and radio propagation characteristics of each wireless terminal.

To facilitate efficient scheduling in the downlink, the wireless terminal sends rather small channel quality indicator (CQI) reports back to the radio base station of the network. These CQI reports are based on known downlink reference signals, which have been sent from the radio base station. In this way, effects of the radio propagation to the wireless terminal can be characterised and reported.

In the uplink, on the other hand, the radio base station can measure and estimate the channel directly, given that the radio base station has something to measure on. In LTE (Long Term Evolution), for example, a so called Sounding Reference Signal (SRS) in the uplink is provided as an uplink reference signal. Using an uplink reference signal, the uplink channel can be estimated. This allows the radio base station to schedule uplink transmission from terminals on frequencies with of good quality.

One issue is how the uplink reference signals are to be configured initially, before any radio bearers have been set up. On one hand, it is desired to send uplink reference signals for most or all frequency bands for uplink scheduling purposes. On the other hand, sending uplink reference signals puts requirements on the wireless terminal, increasing power and battery consumption.

SUMMARY

It is an object to provide a method and network node capable of providing an initial configuration of generation of uplink reference signals in an improved way compared to the prior art.

According to a first aspect, it is presented a method for determining an initial configuration of generation of uplink reference signals for a wireless terminal, the method being performed in a network node. The method comprises: obtaining at least one parameter used in a random access procedure associated with the wireless terminal, wherein each one of the at least one parameter is associated with the wireless terminal; and determining an initial configuration for the wireless terminal for generation of uplink reference signals, based on the at least one parameter.

Using one or more random access parameters to determine the initial configuration is a significant improvement over the prior art. Even though the available random access parameters mainly relate to the downlink channel, using these parameters, an initial rough configuration of the uplink reference signal generation can be selected.

Using this method, in the situation where resources available for uplink reference signals are limited, a prioritization between wireless terminals which benefit the most from uplink reference signals can be effected, even before radio bearers are set up. Moreover, uplink reference signals can be completely disabled in some cases where it is determined that the uplink reference signals would be of no, or negligible, benefit, saving power and battery consumption in the wireless terminal as well as reducing interference in the network until the resources are instead used for any other wireless terminal which is expected to gain more from using uplink reference signals. Moreover, using this method, the need for reconfigurations of the uplink reference signal generation and transmission can be reduced.

The determining may comprise determining an initial configuration comprising a greater amount of uplink reference signals when the at least one parameter indicates a higher uplink data demand. Wireless terminals with higher uplink data demand are more likely to benefit from uplink reference signals.

The determining may comprise determining an initial configuration comprising a greater amount of uplink reference signals when the at least one parameter indicates a downlink channel with lower quality. Wireless terminals associated with lower quality channels are more likely to benefit from uplink reference signals.

In the determining, the at least one parameter may comprise a buffer indicator indicating an amount of data in a transmit buffer of the wireless terminal. For example, a large buffer indicator can indicate a higher uplink data demand. The buffer indicator can e.g. be a buffer status report (BSR).

In the determining, the at least one parameter may comprise a timing alignment parameter indicating a distance between the network node and the wireless terminal. In one example, an initial configuration comprising a greater amount of uplink reference signals is generated when there is a larger timing alignment parameter, indicating a greater distance.

In the determining, the at least one parameter may comprise a parameter indicating an allowable increase in transmission power.

A greater amount of uplink reference signals may comprise one or more of: enabling generation of uplink reference signals, increasing a frequency of transmitting uplink reference signals, and increasing frequency band usage on which uplink reference signals are transmitted. In other words, any one or more of these parameters can be used to increase the amount of uplink reference signals.

The method may further comprise: transmitting the determined initial configuration for generation of uplink reference signals to the wireless terminal.

The transmitting the determined initial configuration may occur before any radio bearers are established between the wireless terminal and the network node. Since random access parameters are used, the initial configuration can be determined prior to any radio bearers are set up.

The uplink reference signal may be a sounding reference signal (SRS). SRS are e.g. used in LTE.

The method may further comprise updating the configuration for generation of uplink reference signals for the wireless terminal, based on parameters related to uplink transmission from the wireless terminal.

The at least one parameter may include one or more parameters selected from the group consisting of a channel quality indicator, a precoding matrix indicator and a rank indicator.

According to a second aspect, it is presented a network node arranged to determine an initial configuration of generation of uplink reference signals for a wireless terminal. The network node comprises: a processor; and a computer program product storing instructions. The instructions, when executed by the processor, causes the network node to: obtain at least one parameter used in a random access procedure associated with the wireless terminal, wherein each one of the at least one parameter is associated with the wireless terminal; and determine an initial configuration for the wireless terminal for generation of uplink reference signals, based on the at least one parameter.

The instructions to determine may comprise instructions to determine an initial configuration comprising a greater amount of uplink reference signals when the at least one parameter indicates a higher uplink data demand.

The instructions to determine may comprise instructions to determine an initial configuration comprising a greater amount of uplink reference signals when the at least one parameter indicates a downlink channel with lower quality.

The at least one parameter may comprise a buffer indicator indicating an amount of data in a transmit buffer of the wireless terminal.

The at least one parameter may comprise a timing alignment parameter indicating a distance between the network node and the wireless terminal.

The at least one parameter may comprise a parameter indicating an allowable increase in transmission power.

A greater amount of uplink reference signals may comprise one or more of: enabling generation of uplink reference signals, increasing a frequency of transmitting uplink reference signals, and increasing frequency band usage on which uplink reference signals are transmitted.

The computer program product may further comprise instructions to: transmit the determined initial configuration for generation of uplink reference signals to the wireless terminal.

The instructions to transmit may occur before any instructions to establish any radio bearers between the wireless terminal and the network node.

The uplink reference signal may be a sounding reference signal.

The computer program product may further comprise instructions to update the configuration for generation of uplink reference signals for the wireless terminal, based on parameters related to uplink transmission from the wireless terminal.

The at least one parameter may include one or more parameters selected from the group consisting of a channel quality indicator, a precoding matrix indicator and a rank indicator.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
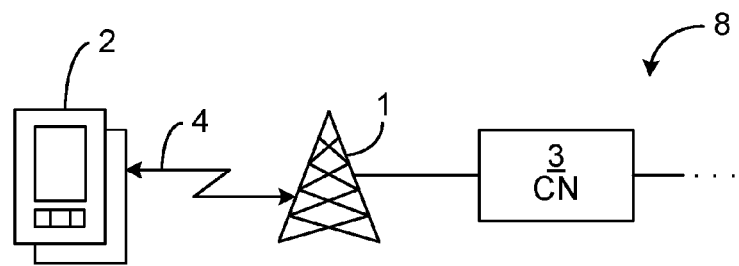
FIG. 1 is a schematic diagram illustrating a cellular network where embodiments presented herein may be applied.

FIG. 1 is a schematic diagram illustrating a cellular network 8 where embodiments presented herein may be applied. The cellular communications network 8 comprises a core network 3 and one or more network nodes 1, here in the form of radio base stations or evolved Node Bs, also known as eNode Bs or eNBs. The network nodes 1 could also be in the form of Node Bs, BTSs (Base Transceiver Stations) and/or BSSs (Base Station Subsystems), etc. The network nodes 1 provide radio connectivity to a plurality of wireless terminals 2. The term wireless terminal is also known as mobile communication terminal, user equipment, mobile terminal, user terminal, user agent, etc.

The cellular network 8 may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, as long as the principles described hereinafter are applicable.

Uplink and downlink communication between each wireless terminal 2 and the radio base station 1 occurs over a wireless radio interface 4. The quality of the wireless radio interface 4 to each wireless terminal 2 varies over time and depending on the position of the wireless terminal 2, due to effects such as fading, multipath propagation, etc.

The network nodes 1 are also connected to a core network 3 for connectivity to central functions and other networks.

A random access procedure in LTE will be described. In LTE, as in any communication system, the wireless terminal 2 may need to initiate contact the network (via the network node 1) without having an established dedicated resource in the uplink. This is one of the scenarios for when a random access procedure is available, where a wireless terminal 2 that does not have a dedicated uplink resource may transmit a signal to the network node 1. The first message of this procedure is typically transmitted on a special resource reserved for random access, a physical random access channel (PRACH) which is shared for any wireless terminals 2 in the cell. The resources available for PRACH transmission are detailed in signals to the terminals as part of broadcasted system information (or as part of dedicated RRC (Radio Resource Control) signaling in case of e.g. handover).

The wireless terminal 2 selects a preamble to be used to allow identification of the wireless terminal 2 and sends a message with the selected preamble to the network node 1. The wireless terminal 2 selects the preamble without regard to any other wireless terminals, so there is a possibility that another wireless terminal transmits using the same preamble in the same time frame, on the same PRACH channel. When such a conflict occurs, this is detected by the network node 1 and the network node 1 performs contention resolution to separate the conflicting wireless terminals.

The network node 1 then establishes one or more bearers which are dedicated to the wireless terminal 2, whereby the wireless terminal 2 is able to communicate with the network.

In LTE, the random access procedure can be used for a number of different reasons. Among these reasons are: initial access, incoming handover, resynchronization of the uplink, scheduling request (for a wireless terminal that is not allocated any other resource for contacting the base station), and positioning.

Figure 2A:
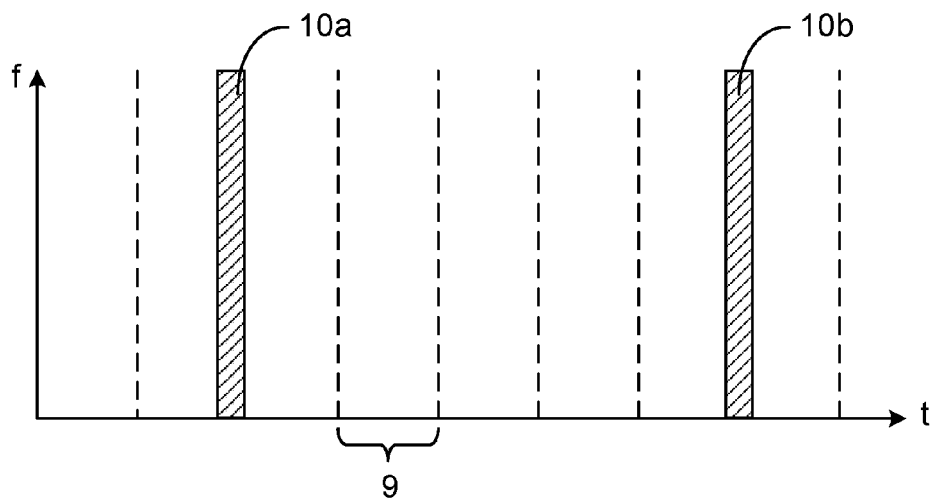
FIGS. 2A-B are schematic diagrams illustrating two different configurations of uplink reference signals for use in the cellular network of FIG. 1.
Figure 2B:
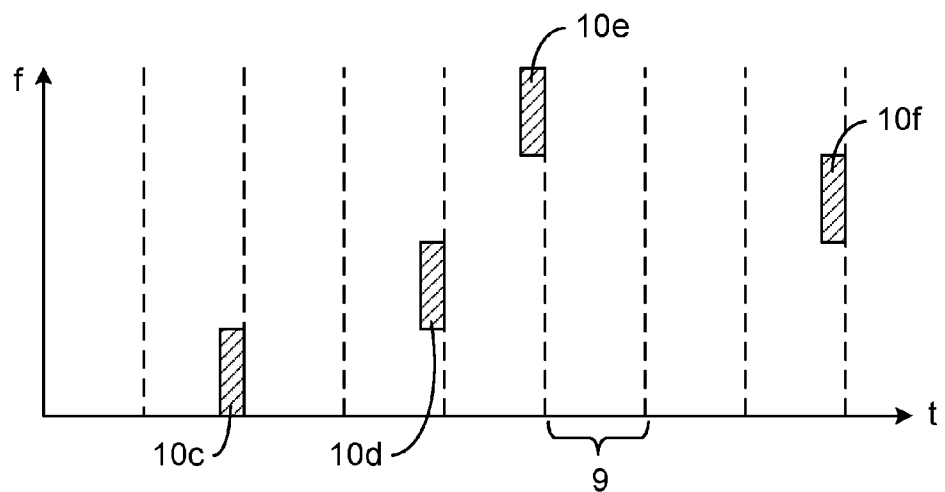

During the random access procedure, a number of parameters are used, some of which are specific to the wireless terminal 2 in question. For example, such parameters can relate to the location of the wireless terminal 2 in relation to the network node 1, radio environment between the network node 1 and the wireless terminal, or buffer levels in the wireless terminal 2. More specifically, such parameters can include any one or more of the following: channel quality indicator (CQI), timing alignment parameters, buffer status report (BSR), rank indicator (RI), precoding matrix indicator (PMI). As will be explained in more detail below, one or of these parameter used in the random access procedure can be used to determine an initial configuration of uplink reference signals for the wireless terminal 1. FIGS. 2A-B are schematic diagrams illustrating two different configurations of uplink reference signals for use in the cellular network of FIG. 1. The uplinks reference signals can e.g. be Sounding Reference Signals, SRS, as defined for LTE. In FIG. 2A-B, time is represented on the horizontal axis, where the space between two dashed lines indicates one subframe 9. Frequency is represented on the vertical axis.

In a first example configuration shown in FIG. 2A, it is shown a first uplink reference signal 10a and a second uplink reference signal 10b. Both these uplink reference signals 10a-b occupy a large frequency band but are sent at two different points in time.

In a second example configuration shown in FIG. 2B, it is shown a third uplink reference signal 10c, a fourth uplink reference signal 10d, a fifth uplink reference signal 10e and a sixth uplink reference signal 10f. Compared to the uplink reference signals of FIG. 2A, each one of these uplink reference signals 10c-f occupy a smaller amount of the frequency band.

The configuration of uplink reference signals can be varied in many ways, e.g. by varying the frequency of transmitting the uplink reference signals, and/or in the selection of frequency band usage on which uplink reference signals are transmitted. Moreover, the transmission of uplink reference signals can be activated or deactivated separately for each wireless terminal using commands from the radio base station. Each wireless terminal can be configured separately in terms of uplink reference signal generation.

Figure 3A:
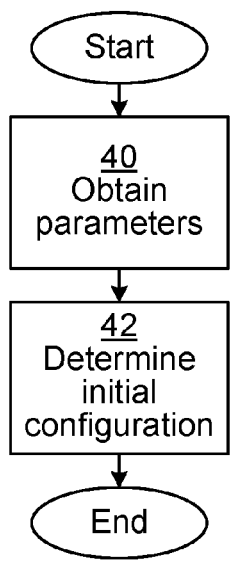
FIGS. 3A-B are flow charts illustrating determination of an initial configuration of generation of uplink reference signals for a wireless terminal of FIG. 1.
Figure 3B:
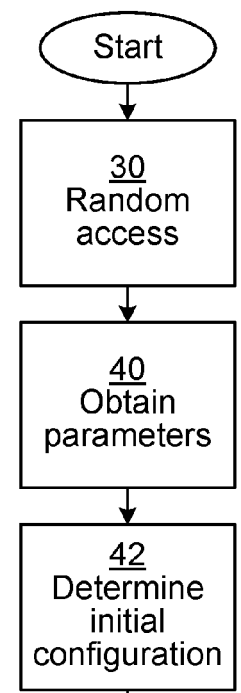

FIGS. 3A-B are flow charts illustrating determination of an initial configuration of generation of uplink reference signals for a particular wireless terminal of FIG. 1. The methods are performed in the network node 1 of FIG. 1 and relate to determining an initial configuration of generation of uplink reference signals prior to any radio bearers are set up.

As explained above, at least in the example of LTE, the uplink reference signal can be a sounding reference signal.

In an initial obtain parameters step 40, at least one parameter is obtained. Each one of the at least one parameters are used in a random access procedure associated with the wireless terminal and each one of the at least one parameter is thus also associated with the wireless terminal. In a determine initial configuration step 42, an initial configuration is determined for the wireless terminal. The configuration controls the generation of uplink reference signals, based on the at least one parameter, as exemplified in FIGS. 2A-B above.

Using one or more random access parameters to determine the initial configuration is a significant improvement over the prior art. Even though the available random access parameters mainly relate to the downlink channel, using these parameters, an initial rough configuration the uplink reference signal generation (and transmission) can be selected. This initial configuration can consider one or more parameters related to location, radio environment of the wireless channel for the wireless terminal, and other specifics regarding the status of the wireless terminals. A greater selection of parameters purely related to the uplink would be even better, but typically, most such parameters are not available until radio bearers are fully set up.

Using this method, in the situation where resources available for uplink reference signals are limited, a prioritization between wireless terminals which benefit the most from uplink reference signals can be effected, even before radio bearers are set up. Moreover, uplink reference signals can be completely disabled in some cases where it is determined that the uplink reference signals would be of no, or negligible, benefit, saving power and battery consumption in the wireless terminal as well as reducing interference in the network until the resources are instead used for any other wireless terminal which is expected to gain more from using uplink reference signals.

Moreover, using this method, the need for reconfigurations of the uplink reference signal generation and transmission can be reduced.

When the at least one parameter indicates a higher uplink data demand, the initial configuration can involve greater amount of uplink reference signals. In other words, all else equal, there is typically a greater benefit of uplink reference signal generation when there is a higher uplink data demand. The uplink data demand can e.g. be indicated by a buffer status report (BSR).

When the at least one parameter indicates a downlink channel with lower quality, the initial configuration can involve greater amount of uplink reference signals. In other words, all else equal, there is typically a greater benefit of uplink reference signal generation when there is a poor radio channel. This can be indicated by downlink channel measurements, such as channel quality indicator (CQI).

The at least one parameter can comprise a timing alignment parameter. Such a parameter can be useful since it indicates a distance between the network node and the wireless terminal. In many instances, it is beneficial with a greater amount of uplink reference signals when the timing alignment is large, since the channel quality typically decreases with greater distances.

The at least one parameter can comprise a parameter indicating an allowable increase in transmission power. For example, this can be indicated by a parameter indicating power headroom.

Other parameters from the random access procedure which can be used to determine the initial uplink reference signal generation can be a precoding matrix indicator (PMI) and/or a rank indicator (RI).

All else equal, a higher RI could indicate that more uplink reference signals should be generated. In one example, when other parameters indicate a good quality channel, a wireless terminal with RI=2 would benefit more from uplink reference signals than a wireless terminal with RI=1.

The method shown in FIG. B is similar to the method shown in FIG. 3A. The steps of FIG. 3A will thus not be described again.

In the method shown in FIG. 3B, a random access step 30 is performed prior to the obtain parameters step 40. The random access step 30 is essentially a conventional random access procedure, with a difference that one or more of the parameters from the random access are stored for later use.

After the determine initial configuration step 42, there is here a transmit initial configuration step 44. In this step, the determined initial configuration from the determine initial configuration step 42 is transmitted to the wireless terminal.

In an establish radio bearers step 46, the network node tasks of establishing radio bearers are performed, as known in the art per se.

Optionally, the transmit initial configuration step 44 and establish radio bearers step 46 can be combined in a single step, which in practice is done in LTE. This can for example be effected using RRC (Radio Resource Control) connection setup and reconfiguration.

In an update configuration step 48, the configuration for generation of uplink reference signals for the wireless terminal is updated, based on more parameters, e.g. related to uplink transmission from the wireless terminal or from other sources which are available at this point. This is in contrast to the determine initial configuration step, where parameters from the random access procedure are considered. More parameters related to uplink transmission from the wireless terminal can be considered here, since the radio bearers have previously been established, compared to the earlier case.

Figure 4:
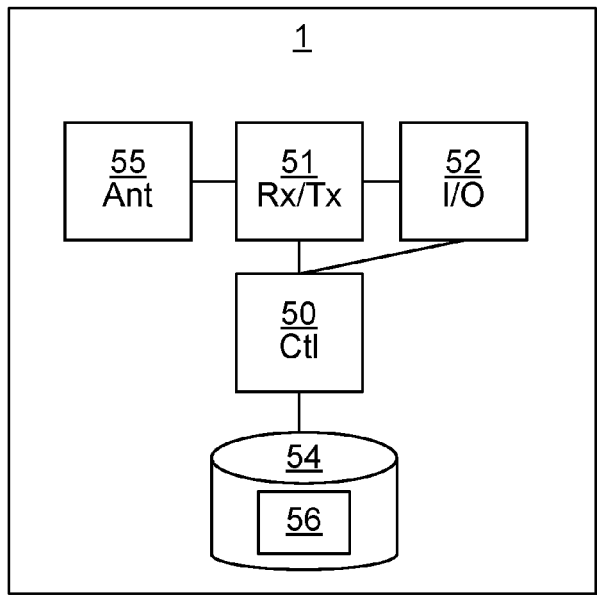
FIG. 4 is a schematic diagram illustrating some components of the network node of FIG. 1.

FIG. 4 is a schematic diagram illustrating some components of the network node of FIG. 1.

A processor 50 is provided using any combination of one or more of a suitable central processing unit (CPU), multi-processor, microcontroller, digital signal processor (DSP), application specific integrated circuit etc., capable of executing software instructions 56 stored in a computer program product 54, e.g. in the form of a memory. The processor 50 may be configured to execute the method described with reference to FIGS. 3A-B above.

The computer program product 54 may be a memory or any combination of read and write memory (RAM) and read only memory (ROM). The memory also comprises persistent storage, which, for example, may be any single one or combination of magnetic memory, optical memory, solid state memory or even remotely mounted memory.

The network node 1 further comprises an I/O interface 52 for communicating with the core network and optionally with other network nodes.

The network node 1 also comprises one or more transceivers 51, comprising analogue and digital components, and a suitable number of antennas 55 for radio communication with wireless terminals within one or more radio cells. The processor 50 controls the general operation of the network node 1, e.g. by sending control signals to the transceiver 51 and receiving reports from the transceiver 51 of its operation.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for determining an initial configuration for generation of uplink reference signals for a wireless terminal in communication with a network node of a wireless communications network, the method being performed in the network node and the method comprising:

obtaining at least one parameter used in a random access procedure established by the wireless terminal over a physical channel in the wireless communications network, wherein each one of the at least one parameter is associated with the wireless terminal;

determining the initial configuration for the wireless terminal for generation of uplink reference signals, based on the at least one parameter, wherein the determining comprises determining the initial configuration comprising a greater amount of uplink reference signals when the at least one parameter indicates a higher uplink data demand and a downlink channel with lower quality;

transmitting the determined initial configuration to the wireless terminal; and controlling the wireless terminal to generate the uplink reference signals.

2. The method according to claim 1, wherein in the determining, the at least one parameter comprises a buffer indicator indicating an amount of data in a transmit buffer of the wireless terminal.

3. The method according to claim 1, wherein in the determining, the at least one parameter comprises a timing alignment parameter indicating a distance between the network node and the wireless terminal.

4. The method according to claim 1, wherein in the determining, the at least one parameter comprises a parameter indicating an allowable increase in transmission power.

5. The method according to claim 1, wherein a greater amount of uplink reference signals comprises one or more of: increasing a frequency of transmitting uplink reference signals, and increasing frequency band usage on which uplink reference signals are transmitted.

6. The method according to claim 1, wherein the transmitting the determined initial configuration occurs before any radio bearers are established between the wireless terminal and the network node.

7. The method according to claim 1, wherein the uplink reference signal is a sounding reference signal.

8. The method according to claim 1, further comprising updating the configuration for generation of uplink reference signals for the wireless terminal, based on parameters related to uplink transmission from the wireless terminal.

9. The method according to claim 1, wherein the at least one parameter includes one or more parameters selected from the group consisting of a channel quality indicator, a precoding matrix indicator and a rank indicator.

10. A network node arranged to determine an initial configuration for generation of uplink reference signals for a wireless terminal in communication with the network node of a wireless communications network, the network node comprising:

a processor; and a memory storing instructions that, when executed by the processor, cause the network node to:

obtain at least one parameter used in a random access procedure established by the wireless terminal over a physical channel in the wireless communications network, wherein each one of the at least one parameter is associated with the wireless terminal;

determine the initial configuration for the wireless terminal for generation of uplink reference signals, based on the at least one parameter, wherein the instructions to determine comprise instructions to determine the initial configuration comprising a greater amount of uplink reference signals when the at least one parameter indicates a higher uplink data demand and a downlink channel with lower quality;

transmit the determined initial configuration to the wireless terminal; and control the wireless terminal to generate the uplink reference signals.

11. The network node according to claim 10, wherein the at least one parameter comprises a buffer indicator indicating an amount of data in a transmit buffer of the wireless terminal.

12. The network node according to claim 10, wherein the at least one parameter comprises a timing alignment parameter indicating a distance between the network node and the wireless terminal.

13. The network node according to claim 10, wherein the at least one parameter comprises a parameter indicating an allowable increase in transmission power.

14. The network node according to claim 10, wherein a greater amount of uplink reference signals comprises one or more of: increasing a frequency of transmitting uplink reference signals, and increasing frequency band usage on which uplink reference signals are transmitted.

15. The network node according to claim 10, wherein the instructions to transmit occur before any instructions to establish any radio bearers between the wireless terminal and the network node.

16. The network node according to claim 10, wherein the uplink reference signal is a sounding reference signal.

17. The network node according to claim 10, wherein the memory further comprises instructions to update the configuration for generation of uplink reference signals for the wireless terminal, based on parameters related to uplink transmission from the wireless terminal.

18. The network node according to claim 10, wherein the at least one parameter includes one or more parameters selected from the group consisting of a channel quality indicator, a precoding matrix indicator and a rank indicator.

* * * * *